United States Patent
Brown et al.

(10) Patent No.: US 7,356,539 B2
(45) Date of Patent: Apr. 8, 2008

(54) POLICY PROXY

(75) Inventors: Michael K. Brown, Kitchener (CA); Neil Adams, Waterloo (CA); Herb Little, Waterloo (CA)

(73) Assignee: Research In Motion Limited

( * ) Notice: Subject to any disclaimer, the term of this patent is extended or adjusted under 35 U.S.C. 154(b) by 346 days.

(21) Appl. No.: 11/097,356

(22) Filed: Apr. 4, 2005

(65) Prior Publication Data

US 2006/0224601 A1 Oct. 5, 2006

(51) Int. Cl.
G06F 7/00 (2006.01)
(52) U.S. Cl. .................................... 707/100
(58) Field of Classification Search ................ 707/100
See application file for complete search history.

(56) References Cited

U.S. PATENT DOCUMENTS

| | | | |
|---|---|---|---|
| 6,942,147 B2 | | 9/2005 | Lahteenmaki et al. |
| 7,035,259 B2* | | 4/2006 | Nomura et al. ............. 370/392 |
| 2002/0165006 A1 | | 11/2002 | Haller et al. |
| 2005/0039019 A1* | | 2/2005 | Delany ....................... 713/176 |

FOREIGN PATENT DOCUMENTS

WO WO-03028313 4/2003

OTHER PUBLICATIONS

Chan, K. , et al., "COPS Usage for Policy Provisioning (COPS-PR)", (Mar. 2001).
Gai, Silvano , et al., "QoS Policy Framework Architecture", IETF Standard-working-draft, Internet Engineering Task Force, IETF, CH, Feb. 10, 1999, XP015035137 ISSN: 0000-0004 chapters 2, 2.1, 2.1.5, 2.1.2.1, 2.3, 2.3.3, 4.2, 6,1-16.
Phanse, K.S., et al., "Design and demonstration of policy-based management in s multy-hop ad hoc network", Ad Hoc Networks, Elsevier, vol. 3, No. 3 Nov. 29, 2003 pp. 389-401, XP004848804 ISSN: 1570-8705,1-16.
IBM Tivoli Access Manager, Base Installation Guide, version 5.1, Nov. 2003, chapter 1, p. 7.

* cited by examiner

*Primary Examiner*—Chong H Kim
(74) *Attorney, Agent, or Firm*—Integral Intellectual Property Inc.; Miriam Paton

(57) ABSTRACT

In a system with a policy server, a first device able to communicate with the policy server and a second device able to communicate with the first device and unable to communicate with the policy server, the first device is to act as a policy proxy. The policy server may communicate to the first device a policy for the second device, and the first device may communicate the policy to the second device.

27 Claims, 3 Drawing Sheets

POLICY PROXY

BACKGROUND OF THE INVENTION

In an organization, an Information Technology (IT) administrator may create IT policies to control the electronic devices in the organization, such as computers, laptops, cellphone, personal digital assistants, printers, and the like. A policy server may store the various IT policies, and may push the relevant IT policy directly to the devices in the organization. Alternatively, the devices may contact the policy server directly to obtain their IT policy.

The organization may include electronic devices that are unable to connect to the policy server. The IT administrator may manually configure each such electronic device according to the established IT policy. However, this is time-consuming and may lead to errors if the manual configuration does not match the intended policy. Moreover, some electronic devices may not include a user interface that is suitable for enabling configuration according to an IT policy.

The IT administrator may also develop IT policies for electronic devices that do not belong to the organization but that communicate with a device that does belong to the organization, or have installed thereon software for use with devices that belong to the organization. Since these devices do not belong to the organization, they may be unable to connect to the policy server and the IT administrator may not have any physical access to them.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Figure 1:
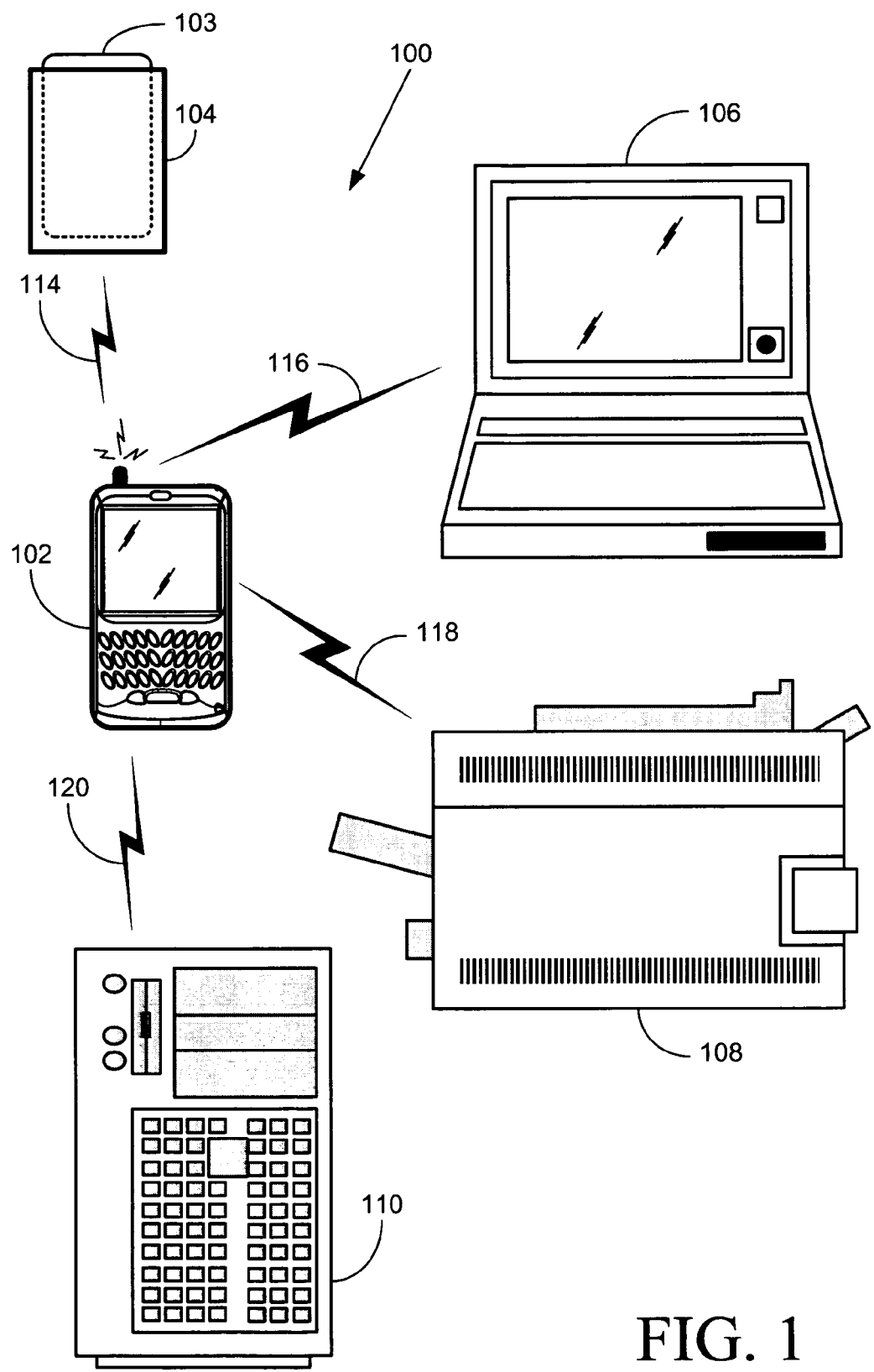
FIG. 1 is a schematic diagram of an exemplary system, according to some embodiments of the invention.

FIG. 1 is a schematic diagram of an exemplary system, according to some embodiments of the invention. A system 100 includes a device 102 and a policy server 110. An IT administrator may store one or more policies on policy server 110. One or more of the policies stored on policy server 110 may apply to device 102, and policy server 110 may push the one or more policies that apply to device 102 over a communication link 120. Device 102 may contact policy server 110 over communication link 120 to request the one or more policies that apply to device 102.

System 100 may also include other devices for which the IT administrator has stored policies on policy server 110. For example, these other devices may include a smart card reader 104, a personal computer 106, and a printer 108, which may be able to communicate with device 102 over communication links 114, 116 and 118, respectively. A smart card 103 is shown inserted into smart card reader 104. Smart card reader 104 and printer 108 may be considered peripherals of device 102, and one or more software applications for use with device 102 may be installed on personal computer 106.

Device 102 may be a mobile device, and communication link 120 may include a segment that is a wireless communication link. For example, communication link 120 may include a cellular telephony link. A non-exhaustive list of examples of cellular telephony standards for the cellular telephony link includes Direct Sequence—Code Division Multiple Access (DS-CDMA), Global System for Mobile Communications (GSM), North American Digital Cellular (NADC), Time Division Multiple Access (TDMA), Extended-TDMA (E-TDMA), wideband CDMA (WCDMA), General Packet Radio Service (GPRS), Enhanced Data for GSM Evolution (EDGE), 3.5G and 4G. In another example, communication link 120 may include a wireless local area network link. A non-exhaustive list of examples of wireless local area network standards for the wireless local area network link includes the Institute of Electrical and Electronic Engineers (IEEE) for Wireless LAN MAC and Physical layer (PHY) 802.11a, b, g and n specifications or future related standards, the Bluetooth® standard, the Zigbee™ standard and the like.

Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with a secret key and with an authentication certificate, and may include a decryption engine, e.g., a processor and/or dedicated decryption logic. A smart card may include a connector for powering the semiconductor device and performing serial communication with an external device. Alternatively, smart card functionality may be embedded in a device having a different form factor and different communication protocol, for example a Universal Serial Bus (USB) device.

The person whose security information is stored on smart card 103 may use smart card reader 104 for identification and to digitally sign and/or decrypt messages sent by device 102. Smart card reader 104 may communicate with device 102 over a wireless communication link 114, for example, a Bluetooth® communication link.

A non-exhaustive list of examples of what an IT policy for smart card reader 104 may include is a) under what circumstances confidential information stored at smart card reader 104 is deleted, b) with which devices smart card reader 104 is allowed to communicate, c) the number of incorrect smart card login attempts before smart card reader 104 is locked, and d) which algorithms smart card reader 104 is allowed to use to protect wireless communication link 114. However, smart card reader 104 may lack a user interface that is suitable for configuring this policy in smart card reader 104. Also, smart card reader 104 may be unable to communicate with policy server 110. Policy server 110 may communicate a policy for smart card reader 104 to device 102, and device 102 may communicate the policy to smart card reader 104.

Printer 108 may be a local printer that communicates with device 102 over wireless communication link 118, for example, a Bluetooth® communication link. A non-exhaustive list of examples of what an IT policy for printer 108 may include is a) font or template information on how to print out forms of the organization, b) printer resolution (e.g., dots per inch), and c) which devices printer 108 is allowed to connect to. Printer 108 may be unable to communicate with policy server 110. Policy server 110 may communicate a policy for printer 108 to device 102, and device 102 may communicate the policy to printer 108.

Personal computer 106 may be a home computer of a person who belongs to the organization, and may have a software application installed thereon for use with device 102. An IT policy for personal computer 106 may, for example, affect how the software application operates. Policy server 110 may communicate a policy for personal computer 106 to device 102, and device 102 may communicate the policy to personal computer 106.

In general, policy server 110 may communicate to device 102 a policy for another device that is able to communicate with device 102 and unable to communicate with policy server 110, and device 102 may communicate the policy to the other device. Device 102 may contact policy server 110 over communication link 120 to request one or more policies for the other device. Device 102 may collect information regarding which other devices it is communicating with and may report that information to policy server 110. Device 102 may also send a confirmation back to policy server 110 once a policy received at device 102 and communicated to another device is applied at the other device.

Figure 2:
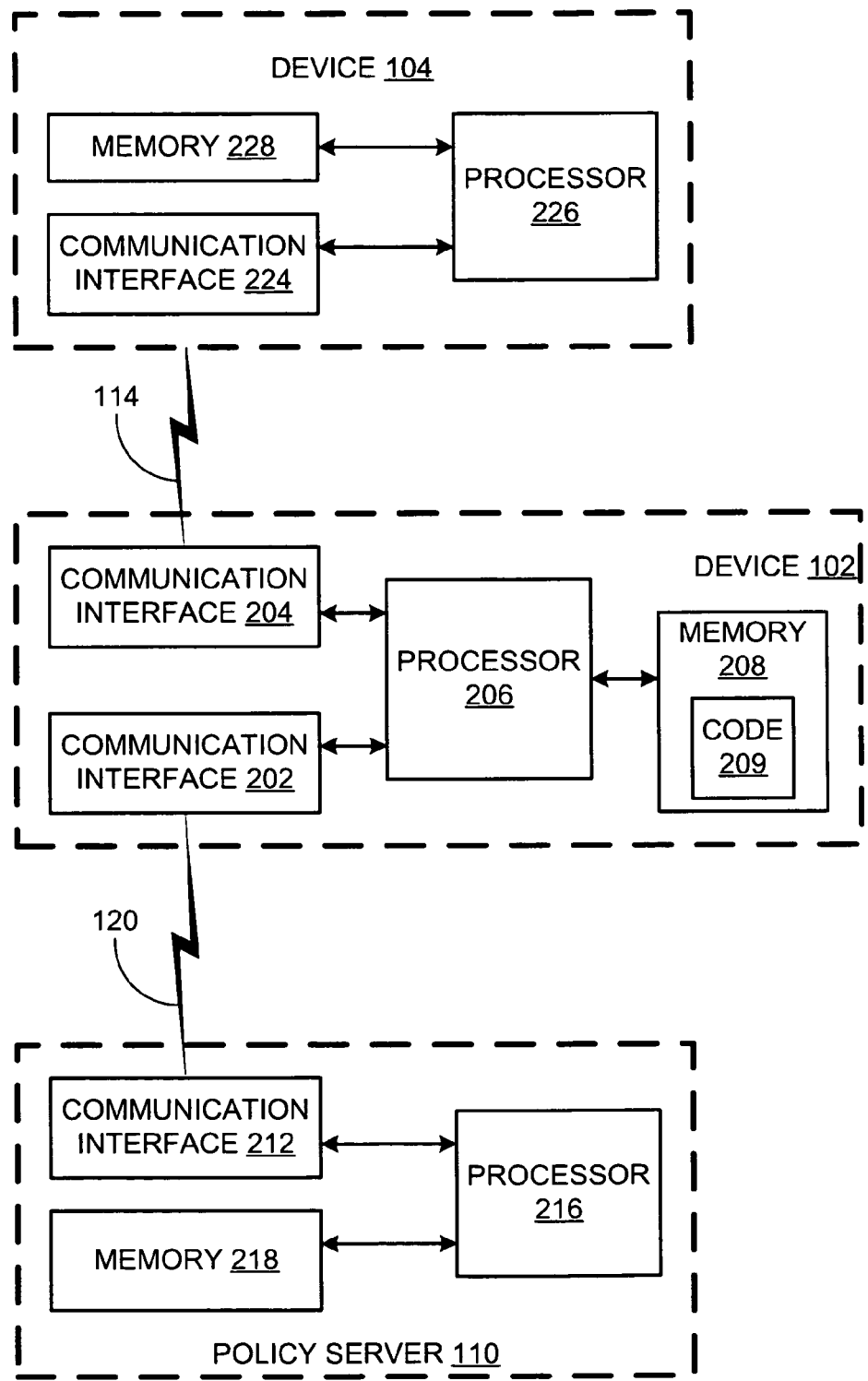
FIG. 2 is a block diagram of some component of the exemplary system of FIG. 1, according to some embodiments of the invention.

FIG. 2 is an exemplary block diagram of policy server 110, device 102 and device 104, according to some embodiments of the invention.

Device 102 may include a communication interface 202 through which device 102 is able to receive a policy from policy server 110. Device 102 may also include a communication interface 204 through which device 102 is able to transmit all or a portion of the policy to device 104. Communication interface 202 may be compatible, for example, with a wireless local area network standard or with a cellular telephony standard. Communication interface 204 may be compatible, for example, with the Bluetooth® standard.

Device 102 may also include a processor 206 coupled to communication interface 202 and to communication interface 204. Device 102 may also include a memory 208, coupled to processor 206. Memory 208 may store executable code 209 to be executed by processor 206. Memory 208 is able to store one or more policies received from policy server 110.

Policy server 110 may include a communication interface 212, a processor 216 coupled to communication interface 212, and a memory 218 coupled to processor 216. Memory 218 is able to store IT policies.

Device 104 may include a communication interface 224, a processor 226 coupled to communication interface 224, and a memory 228 coupled to processor 226. Memory 228 is able to store one or more policies received from device 102. Communication interface 224 may be compatible with the same standard as communication interface 204.

Figure 3:
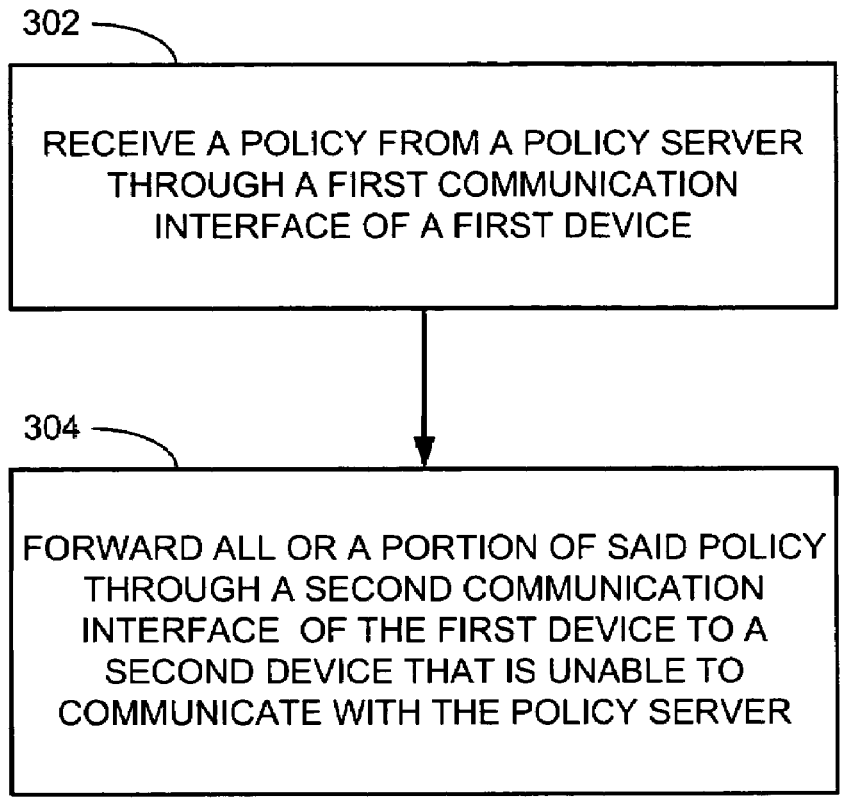
FIG. 3 a flowchart of an exemplary method, according to some embodiments of the invention.

FIG. 3 is a flowchart of an exemplary method to be implemented by device 102, according to some embodiments of the invention. Executable code 209, when executed by processor 210, may cause device 102 to implement the method of FIG. 3.

At 302, device 102 receives a policy from policy server 110 through communication interface 202 over communication link 120. At 304, device 102 transmits all or a portion of the policy through communication interface 204 to another device that is unable to communicate with policy server 110.

A non-exhaustive list of examples for device 102 includes a cellular phone, a personal digital assistant (PDA), an electronic mail (Email) client, a gaming device, a laptop computer, a notebook computer, a desktop computer, a server computer, and any other suitable apparatus.

A non-exhaustive list of examples for processors 206, 216 and 226 includes a central processing unit (CPU), a digital signal processor (DSP), a reduced instruction set computer (RISC), a complex instruction set computer (CISC) and the like.

Memories 208, 218 and 228 may be fixed in or removable from device 102, policy server 110 and device 104, respectively. A non-exhaustive list of examples for memories 208, 218 and 228 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

Processors 206, 216 and 226, and memories 208, 218 and 228 are functional blocks and may be implemented in any physical way in device 102, policy server 110 and device 104, respectively. For example, processor 206 and memory 208 may each be implemented in a separate integrated circuit, and optionally in additional discrete components. Alternatively, some of the functional blocks may be grouped in one integrated circuit. Furthermore, the functional blocks may be parts of application specific integrated circuits (ASIC), field programmable gate arrays (FPGA) or application specific standard products (ASSP).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A system comprising:

a policy server;

a first device able to communicate with said policy server;

one or more other devices able to communicate with said first device and unable to communicate with said policy server, wherein said first device is arranged to collect information regarding those of said other devices with which said first device is communicating, to report said information to said policy server, to contact said policy server to request a policy for one of said other devices, to receive from said policy server a policy for said one of said other devices, and to send all or a portion of said policy to said one of said other devices.

2. The system of claim 1, wherein said first device is a mobile device and said one of said other devices is able to communicate with said mobile device over a wireless communication link.

3. The system of claim 1, wherein said one of said other devices is a smart card reader.

4. The system of claim 1, wherein said one of said other devices is a printer.

5. The system of claim 2, wherein said wireless communication link is a Bluetooth® communication link.

6. The system of claim 1, wherein said first device is a mobile device and said first device is able to communicate with said policy server over a communication link at least a segment of which is a wireless communication link.

7. The system of claim 6, wherein said wireless communication link is a cellular telephony link.

8. The system of claim 6, wherein said wireless communication link is a wireless local area network link.

9. The system of claim 1, wherein said one of said other devices has installed thereon a software application for use with said first device, and said policy affects how said software application operates.

10. A first device comprising:
a processor;
a first communication interface coupled to said processor and through which said first device is able to communicate with a policy server; and
a second communication interface coupled to said processor through which said first device is able to communicate with other devices that are unable to communicate with said policy server,
wherein said first device is arranged to collect information regarding those of said other devices with which said first device is communicating, to report said information to said policy server, to contact said policy server to request a policy for said one of said other devices, to receive from said policy server a policy for said one of said other devices and to send all or a portion of said policy to said one of said other devices.

11. A method in a first device, the method comprising:
collecting information regarding other devices with which said first device is communicating and which are unable to communicate with a policy server;
reporting said information to said policy server;
contacting said policy server to request a policy for one of said other devices;
receiving from said policy server said policy at said first device; and
transmitting all or a portion of said policy from said first device to said one of said other devices.

12. The system of claim 3, wherein said policy includes under what circumstances confidential information stored at said smart card reader is deleted.

13. The system of claim 3, wherein said policy includes with which devices said smart card reader is allowed to communicate.

14. The system of claim 3, wherein said policy includes a number of incorrect smart card login attempts before said smart card reader is locked.

15. The system of claim 3, wherein said policy includes which algorithms said smart card reader is allowed to use to protect a communication link with said first device.

16. The first device of claim 10, wherein said one of said other devices is a smart card reader and said policy includes under what circumstances confidential information stored at said smart card reader is deleted.

17. The first device of claim 10, wherein said one of said other devices is a smart card reader and said policy includes with which devices said smart card reader is allowed to communicate.

18. The first device of claim 10, wherein said one of said other devices is a smart card reader and said policy includes a number of incorrect smart card login attempts before said smart card reader is locked.

19. The first device of claim 10, wherein said one of said other devices is a smart card reader and said policy includes which algorithms said smart card reader is allowed to use to protect a communication link with said first device.

20. The method of claim 11, wherein said one of said other devices is a smart card reader and said policy includes under what circumstances confidential information stored at said smart card reader is deleted.

21. The method of claim 11, wherein said one of said other devices is a smart card reader and said policy includes with which devices said smart card reader is allowed to communicate.

22. The method of claim 11, wherein said one of said other devices is a smart card reader and said policy includes a number of incorrect smart card login attempts before said smart card reader is locked.

23. The method of claim 11, wherein said one of said other devices is a smart card reader and said policy includes which algorithms said smart card reader is allowed to use to protect a communication link with said first device.

24. The first device of claim 10, wherein said first communication interface is compatible with a first wireless communication standard and said second communication interface is compatible with a second, different wireless communication standard.

25. The first device of claim 24, wherein said first communication standard is a wireless local area network standard.

26. The first device of claim 24, wherein said first communication standard is a cellular telephony standard.

27. The first device of claim 24, wherein said second communication standard is the Bluetooth® standard.

* * * * *